(12) United States Patent
Melman

(10) Patent No.: US 7,917,261 B2
(45) Date of Patent: Mar. 29, 2011

(54) SYSTEM AND METHODS FOR CONTROLLING VEHICULAR FUNCTIONS

(76) Inventor: Emanuel Melman, Boca Raton, FL (US)

( * ) Notice: Subject to any disclaimer, the term of this patent is extended or adjusted under 35 U.S.C. 154(b) by 813 days.

(21) Appl. No.: 11/859,781

(22) Filed: Sep. 23, 2007

(65) Prior Publication Data
US 2009/0082912 A1    Mar. 26, 2009

(51) Int. Cl.
*G06F 7/00*   (2006.01)
*G06F 13/38*  (2006.01)

(52) U.S. Cl. .............................. 701/36; 307/10.3; 726/11

(58) Field of Classification Search .................. None
See application file for complete search history.

(56) References Cited

U.S. PATENT DOCUMENTS

| | | | |
|---|---|---|---|
| 6,141,710 A * | 10/2000 | Miesterfeld | 710/100 |
| 6,314,351 B1 * | 11/2001 | Chutorash | 701/36 |
| 6,353,785 B1 * | 3/2002 | Shuman et al. | 701/48 |
| 6,559,773 B1 * | 5/2003 | Berry | 340/815.4 |
| 6,781,507 B1 | 8/2004 | Birchfield et al. | |
| 6,812,829 B1 | 11/2004 | Flick | |
| 6,828,901 B2 | 12/2004 | Birchfield et al. | |
| 7,224,083 B2 | 5/2007 | Flick | |
| 7,356,832 B1 * | 4/2008 | Eibach et al. | 726/2 |
| 7,484,008 B1 * | 1/2009 | Gelvin et al. | 709/249 |
| 7,684,904 B2 * | 3/2010 | Wainwright et al. | 701/3 |
| 2003/0117298 A1 * | 6/2003 | Tokunaga et al. | 340/989 |
| 2004/0094912 A1 | 5/2004 | Niwa | |
| 2004/0167689 A1 | 8/2004 | Bromley | |
| 2005/0102074 A1 | 5/2005 | Kolls | |
| 2005/0179322 A1 * | 8/2005 | Flick | 307/10.6 |
| 2007/0000712 A1 * | 1/2007 | Kamiya | 180/287 |
| 2007/0015485 A1 * | 1/2007 | DeBiasio et al. | 455/345 |
| 2007/0142977 A1 * | 6/2007 | Munoz | 701/1 |

* cited by examiner

*Primary Examiner* — Michael J. Zanelli
(74) *Attorney, Agent, or Firm* — Jennifer Meredith, Esq.; Meredith & Keyhani, PLLC

(57) ABSTRACT

A method of controlling a control system for a vehicle comprising: providing at least one data communications bus; providing at least one firewall in communication with at least one data communications bus, wherein the at least one firewall creates at least two data communications bus from the at least one data communications bus; providing at least one vehicle device in communication with at least one of at least two data communications bus; providing at least one vehicle device in communication with at least one firewall; and providing at least one firewalled controller in communication with at least one firewall, wherein the firewalled controller transmits a directive to the firewall and the firewall transmits the directive through the at least two data communications bus which controls the at least one vehicle device.

31 Claims, 3 Drawing Sheets

SYSTEM AND METHODS FOR CONTROLLING VEHICULAR FUNCTIONS

The present invention relates generally to systems and methods for controlling vehicular functions.

Modern vehicles have a plurality of electronic modules, each responsible for at least one task. A typical engine control unit, for example, is usually located in close proximity to the engine. It has inputs and outputs. Inputs may be, for example, vehicle speed sensor, crankshaft position sensor, throttle position sensor, mass airflow sensor, coolant temperature sensor, cam position sensor, knock sensor, and more. Outputs may be spark plug signal(s), injector(s) power, fuel pump, starter relay, turbo wastegate, and other. The internal program within this control module (engine control module in this example) defines the relationship between inputs and outputs. If each wire for each input and output is discrete, analog, specific for one sensor and some information must be displayed on, for example, the instrument cluster to show the driver certain data that the driver is familiar with such as RPM, Speed, Coolant temperature, Low battery, Oil level, Check engine light and so on. Historically, separate wires used to carry all those individual signals to the instrument cluster for the driver to note.

As the amount of electronic modules in a vehicle grew with time, manufacturers notices that they are dealing with a huge amount of such wires thru out a vehicle. Wires means added weight and increased costs.

Thus the need arose for a reliable communications network to communicate between various modules while reducing the amount of wires, and still retain a high level of fault-tolerance. With bussed (paralleled) communication networks like CAN (Controller Area Network) a plurality of modules could communicate with each other, relaying data and commands to each other, at high speeds and high reliability, via a single wire or two wires only.

Another problem to be solved is the integration of factory installed with external components, such as portable music players, Reverse cameras, Multimedia accessories (example: iPod). As one example, currently, iPod users can integrate their iPod with their factory installed radio. However, the display is not integrated which can be dangerous. The user must look at a small iPod screen to use their iPod while driving. It would be desirable to have the iPod screen on the factory installed radio equipment which is larger and may be integrated in steering wheel controls and other added safety features. As another example, standard factory equipment that comes with a vehicle may provide electronics that are integrated and interdependent. For example, the radio in certain vehicles also controls the turn signal sound and chime reminding a driver to fasten you're their seatbelt. If the factory installed radio were removed you may lose the safety features, the car may not be up to safety standards and may not be road legal and/or may not pass inspection. The present invention may utilize factory installed equipment to provide greater functions out of existing electronics and installation.

Accordingly, what is needed is a system and method that may (or may not) use factory installed equipment to isolate at least one component from the rest of the network to provide reliable, undistorted and accurate communications.

SUMMARY OF THE INVENTION

The present invention relates generally to systems and methods for controlling vehicular functions.

According to one embodiment, a control system for a vehicle is provided comprising: at least one data communications bus; at least one firewall in communication with the at least one data communications bus, wherein the firewall creates at least two data communications bus from the at least one data communications bus; at least one vehicle device in communication with at least one of the at least two data communications bus; at least one vehicle device in communication with at least one firewall; and at least one firewalled controller in communication with at least one firewall, wherein the firewalled controller transmits a directive to the firewall and the firewall transmits the directive through the at least two data communications bus which controls the at least one vehicle device.

According to another embodiment, a method of controlling a control system for a vehicle is provided comprising the steps of: providing at least one data communications bus; at least one firewall in communication with the at least one data communications bus, wherein the firewall creates at least two data communications bus from the at least one data communications bus; providing at least one vehicle device in communication with at least one of the at least two data communications bus; providing at least one vehicle device in communication with the at least one firewall; and providing at least one firewalled controller in communication with the at least one firewall, wherein the firewalled controller transmits a directive to the firewall and the firewall transmits the directive through the at least two data communications bus which controls the at least one vehicle device.

These and other features, aspects and advantages of the present invention will become better understood with reference to the following description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
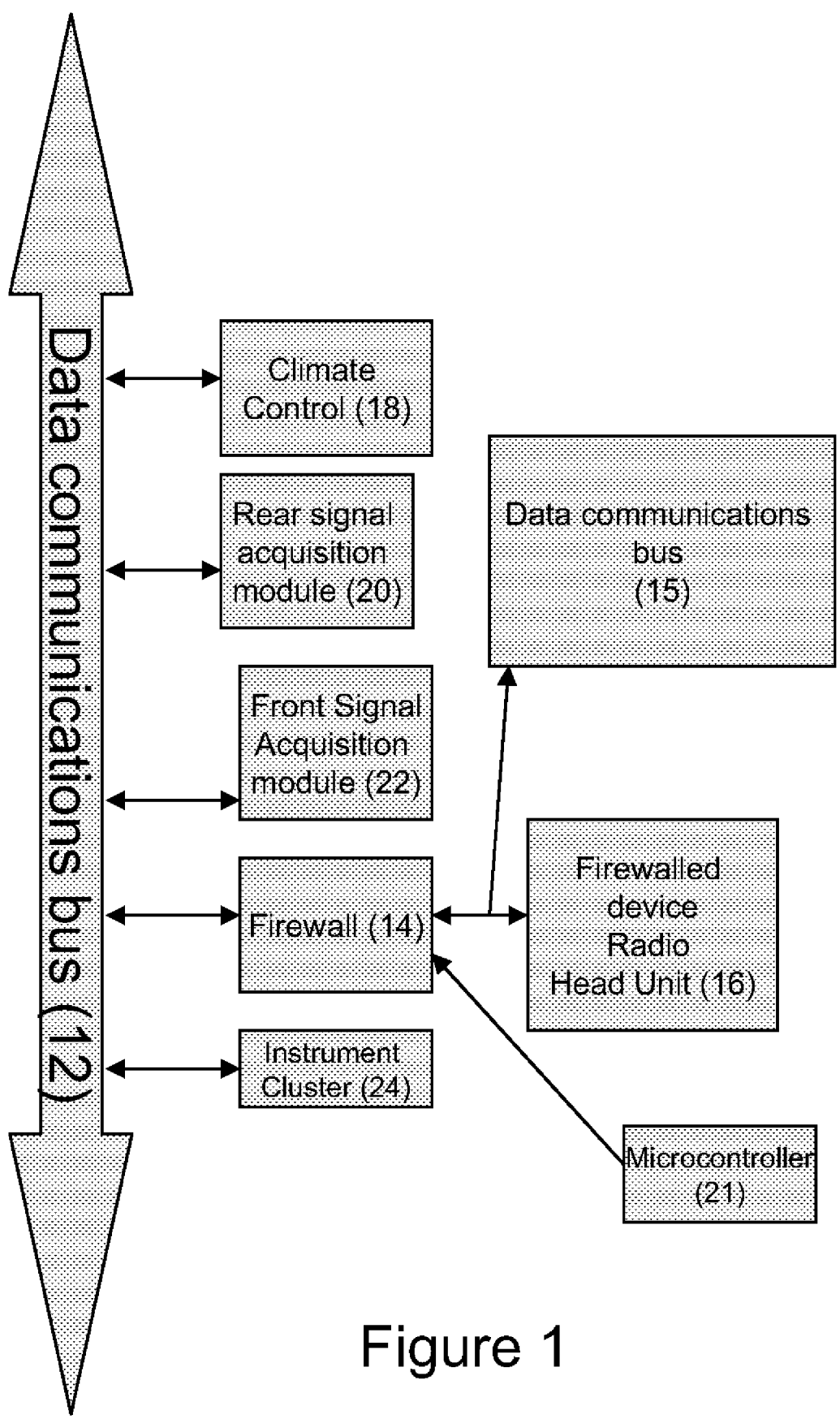
FIG. 1 depicts a vehicle control system including at least one data communication bus, according to aspects of the present invention.
Figure 2:
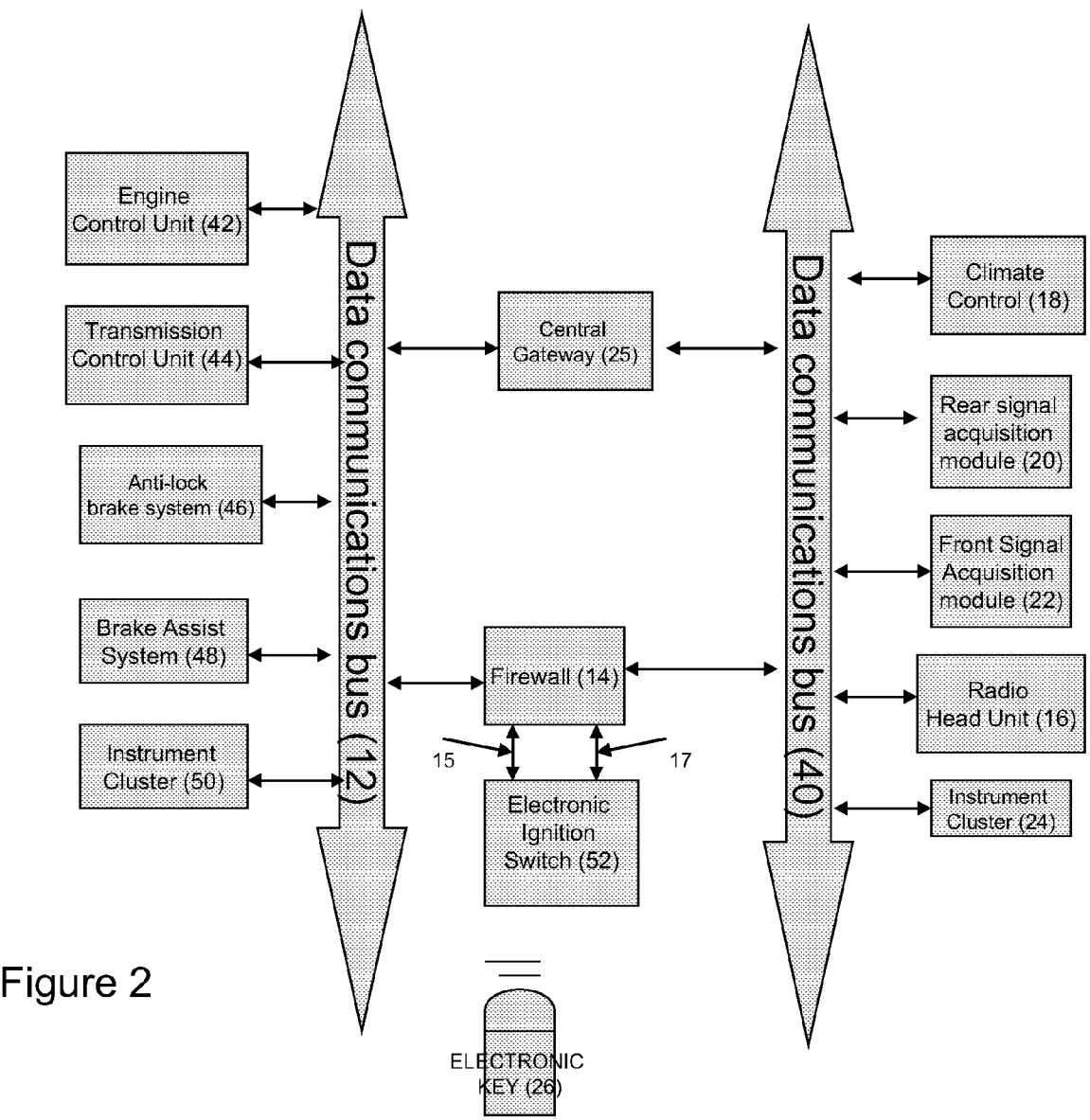
FIG. 2 depicts a vehicle control system including at least two data communication buses, according to aspects of the present invention.

The present invention provides a control system for a vehicle comprising: at least one data communications bus (12); and a firewall (14) that is in communication with the data communications bus (12) and creates at least two data communications buses (e.g. 12 and 15) from the at least one data communications bus (12). One data communication bus may be a private bus and another may be a vehicle bus according to one embodiment. The term private bus refers to the bus connecting the firewall to the firewalled device, since the rest of the vehicle network does not physically share this new bus. As shown in FIG. 1, the firewall may create the at least two data communication buses (e.g. 12 and 15) by interrupting and firewalling the first data communications (12). There is also at least one vehicle device (e.g. 18, 20, 22 and 24) in communication with at least one (12) of the at least two data communications buses; at least one vehicle device (e.g. 18, 20, 22 and 24) in communication with the at least one firewall (14);

and at least one firewalled controller (in FIG. 1, the firewalled controller is the firewalled device, the radio head unit (16)) which is in communication with at least one firewall (14), and the firewall transmits the directive through the data communications bus (12) which controls the at least one vehicle device (e.g. 18, 20, 22 and 24). The data communications bus physical layer may be any medium, according to one embodiment it is a set of electrical wires, according to another, without limitation, it may be a fiber optic link. Specific communications buses, by way of example, are Controller Area Network (CAN), General Motors Local Area Network (GM-LAN), CLASS 2, J1850, Media Oriented Systems Transport (M.O.S.T). The firewall may be an active or inactive firewall. During operation, the firewall is active. However, during failsafe mode it may become inactive. The firewalled controller (16) may be an electronic ignition switch (such as electronic ignition switch (52) as shown in FIG. 2), it may also be the actual components (such as the radio) or any other node on the bus. The firewall (14) may change the directive and/or content of data prior to transmission. A microcontroller (21) may be external or internal to the firewall (14). With reference to FIG. 2, where there are two data communications buses (12 and 40), the firewall (14) interrupts and creates four data communications buses (12, 40, 15 and 17). There may be a central gateway 25 between the first data communication bus (12) and second data communication bus (40). The vehicle device may be, without limitation, a engine control unit, a transmission control unit, antilock brake system, brake assist system, instrument cluster, climate control, rear signal acquisition module, front signal acquisition module, radio head unit, a security immobilizer circuit, security authorizing device, suspension control module, an engine control unit, security immobilizer circuit or any other electronic module on the bus. There may also be at least one sensor. Additionally there may be at least one accessory device wherein the accessory device monitors the at least two data communications buses and issues directives according to the status of the at least two data communications buses.

As one example, a portable music player (iPod) interface embodiment in is envisioned by the present invention. With reference to FIG. 1, Example of real bus traffic in an automobile (for example, a Mercedes): Radio (16) sends the message "192 43 44 31" every 100 mS. 43 44 31 in ASCII translates to CD1, indicating that the first compact disc is currently playing. "192" is the hexadecimal value of the specific arbitration ID. (message ID). Radio (16) also sends the message "193 54 72 61 63 20 31" every 100 mS, where 54 72 61 63 20 31 translates to "Track 1" in ASCII indicating Track 1 is currently playing. "193" is the hexadecimal value of the specific arbitration ID. (message ID). The instrument cluster is connected to the vehicle bus (12) and contains an LCD display capable of displaying various text, including data from the radio such as station displays "FM 3" on the first text line and "100.3" on the second line, CD display such as "CD1" on line 1 and "Track 1" on line 2, etc. Instrument cluster (24) is programmed to acknowledge messages starting with arbitration ID 192 and displaying the values following the ID as Text (ASCII decoded) on the FIRST line of the display on the instrument cluster. Instrument cluster (24) is also programmed to acknowledge messages starting with arbitration ID 193 and displaying the values following the ID as Text (ASCII decoded) on the SECOND line of the display on the instrument cluster. In this embodiment, the firewall must replace data bytes sent by the radio with data bytes originated in the music player (iPod) which, of course, is not directly a part of the vehicle network and the cluster does not have means of communicating directly with. Music player is playing a song by the group (Artist) ABBA. Firewall (14) intercepts the message "192 43 44 31" (CD1) sent by headunit (16) via bus (15) and immediately acknowledges reception back to headunit (16), which in turn "believes" the Instrument cluster (24) sent the acknowledgment. Within a few machine cycles (this is a term that defines the micro-controller speed, a few microseconds in our case) Firewall (14) "replaces" the text "CD1" with the text "Artist" and sends the message "192 41 72 74 69 73 74" (Artist in ASCII) to vehicle network (12). Instrument cluster (24) receives and acknowledges reception of this message, and in turn decodes and displays "Artist" on it's first line of the display. Similarly, Firewall (14) intercepts the message "192 54 72 61 63 20 31" (Track 1) sent by headunit (16) via bus (15) and immediately acknowledges reception back to headunit (16), which in turn "believes" the Instrument cluster (24) sent the acknowledgment. Within a few machine cycles Firewall (14) "replaces" the text "Track 1" with the text "ABBA" and sends the message "192 41 42 42 41" (ABBA in ASCII) to vehicle network (12). Instrument cluster (24) receives and acknowledges reception of this message, and in turn decodes and displays "ABBA" on it's Second line of the display. As a result, although the radio is actually playing track 1 of CD 1, the instrument cluster displays "Artist" "ABBA".

Figure 3:
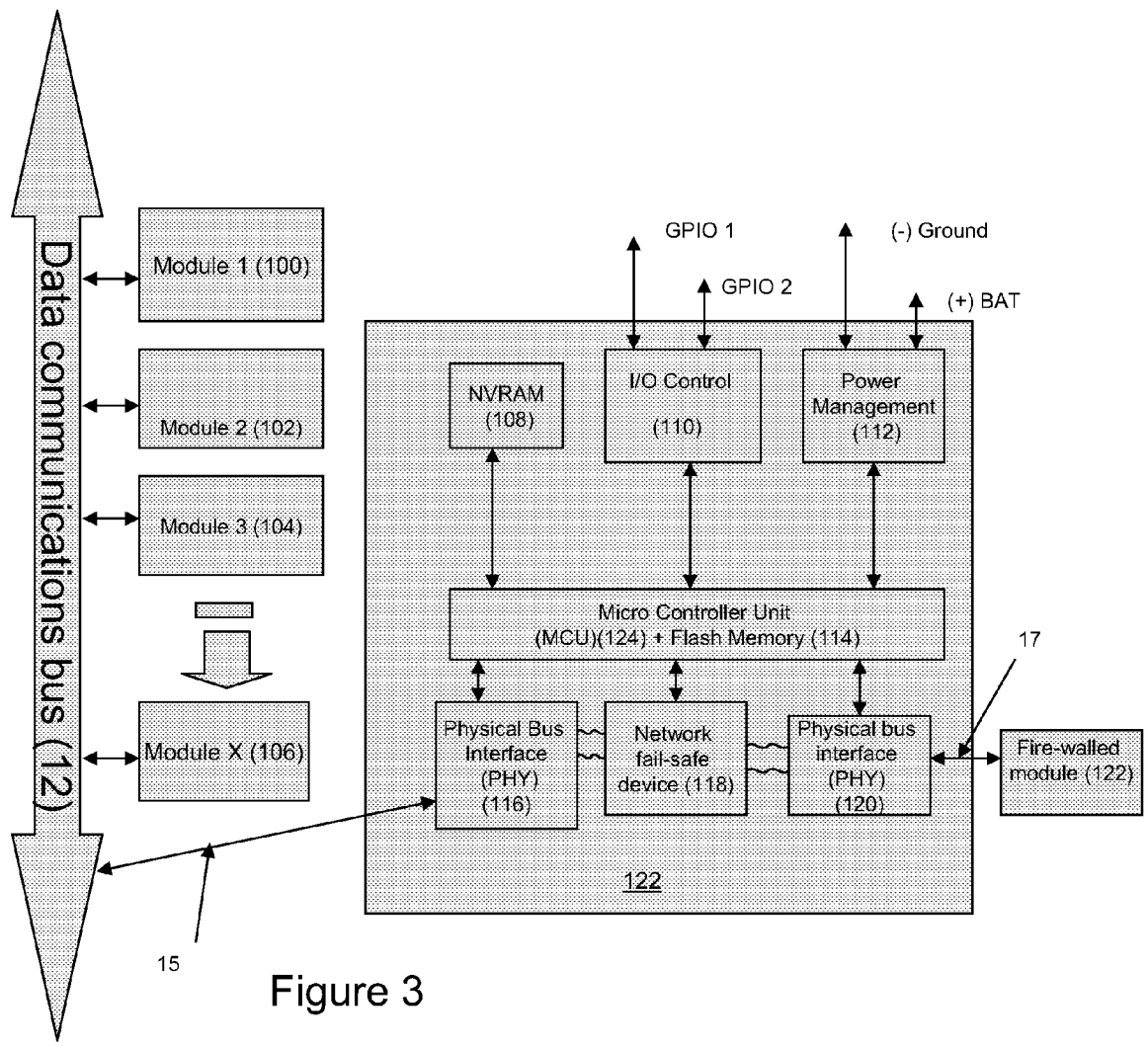
FIG. 3 depicts a more detailed presentation of a firewall used in vehicle control systems, according to aspects of the present invention.

As shown in FIG. 3, the firewall (122) may have a power management module (112); an I/O control (110); at least one storage module (114); a microcontrol unit (124) in communication with the power management module (112), the I/O controller (110) and the storage module (114); at least one bus interface that is firewalled to create two bus interfaces (116 and 120) and is in communication with the microcontrol unit (124); at least one network fail safe device (118) is in communication with the microcontrol unit (124) and at least two bus interface (e.g. 116 and 120); and at least one physical bus interface (e.g. 116 and 120) is in communication with the microcontrol unit (124) and at least one network fail safe device (118). The at least one network fail safe device (118) may be between a first bus interface (116) and a second bus interface (120) and the network fail safe device (118) would bridge the first bus interface (116) and the second bus interface (120). The two bus interfaces (116 and 120), as shown in in FIG. 3 are the bare minimum configuration, they are connected each to one bus and bridged by a smart fail-safe device. The micro controller unit (124) may be further comprised of flash memory (114).

The present invention also envisions a method of exchanging information with a control system for a vehicle comprising the steps of: providing at least two data communications bus; providing at least one firewall in communication with at least two data communications bus; providing at least one vehicle device in communication with at least one of the at least two data communications bus; providing at least one vehicle device in communication with at least one firewall; and providing at least one firewalled controller in communication with the at least one firewall, wherein said firewalled controller allows a directive to said firewall through said at least one communication bus which controls said at least one vehicle device and said firewall allows said directive through a second at least one data communications bus which controls at least one said vehicle device. The firewall may allows directives through the at least one data communications bus. There may also be the step of isolating the at least one vehicle device. There may be a security authorizing device, wherein the security authorizing device authorizes use or denies use and when said security authorizing device authorizes use said firewall obtains security codes from said security authorizing device said firewall emulates said security codes and issues procedures according to said security codes. The security authorizing device such as an EIS (Electronic Ignition Switch) may tell the rest of the car if a good key has been inserted, and if the key position is OFF, Accessory, Start or RUN. Once firewalled, the firewall issues such commands after calculating the security codes it's previously learned from the firewalled device, therefore emulating the firewalled device and issuing starting procedures to the rest of the vehicle. This could not be achieved if the device would not be firewalled since there would be contradicting information being constantly sent.

The security authorizing device may be selected from the group consisting of an electronic ignition switch, transponder receiver, convertible top module. There may be a suspension control module provided, wherein the firewall issues directives to the suspension control module in response to a trigger. For example, a suspension control module could lower the vehicle when it is over a certain speed for better traction and less drag, while raising the vehicle at lower speeds for more ground clearance. Once firewalled, a button press could lower and raise the car on demand regardless of vehicle speed in order to achieve a certain cosmetic effect. The trigger may be manual (for example pressing a button). The trigger may also be responsive to a trigger input. By way of example, when the car reaches a predetermined speed. The firewalled controller (26) may be an electronic ignition switch and the electronic ignition switch may perform secondary functions in response to a trigger input. For example, when certain buttons are pressed a new function may be achieved. By way of example, some cars have buttons on a remote or FOB which may have a lock, unlock and trunk button. Pushing each button performs that specific function. However, the present invention provides that secondary functions may be performed. For example, if the lock button is pressed twice, the radio may go on. If the lock and the unlock button are pressed at the same time the car may remote start. These are just examples, it is envisioned that any number of secondary functions may be programmed and performed. Another example may be a convertible top module. There may be a trigger (such as pressing the trunk button and the unlock button) and the convertible top module may be firewalled from the vehicle. The firewall will issue and open and close command as part of programming. This may in response to a manual trigger (pressing a button) or in response to other signals on the bus, such as locking the doors or pressing a button on the factory remote control. There may be a sensor that senses rain and temperature and directs the top to open under predetermined conditions (for example, if it is over 80 degrees Fahrenheit and not raining, the top automatically opens once the doors are unlocked.

It should be understood that the foregoing relates to preferred embodiments of the invention and that modifications may be made without departing from the spirit and scope of the invention as set forth in the following claims.

I claim:

1. A control system for a vehicle comprising:
   at least one data communications bus;
   at least one firewall in communication with said at least one data communications bus, wherein said at least one firewall creates at least two data communications bus from said at least one data communications bus;
   at least one vehicle device in communication with at least one of said at least two data communications bus;
   wherein said at least one vehicle device is in communication with said at least one firewall; and
   at least one firewalled controller in communication with said at least one firewall,
   wherein said firewalled controller allows a directive to be transmitted to said firewall through said at least one communication bus which controls said at least one vehicle device and said firewall allows said directive through a second at least one data communications bus which controls said at least one vehicle device, and
   wherein said firewall changes said directive prior to transmission.

2. A control system as in claim 1, wherein said firewalled controller is an electronic ignition switch.

3. A control system as in claim 1, further comprising a central gateway, wherein said central gateway is between the at least one data communication bus and a third data communication bus.

4. A control system as in claim 1, wherein said at least one vehicle device is selected from the group consisting of engine control unit, transmission control unit, antilock brake system, brake assist system, climate control, rear signal acquisition module, front signal acquisition module, radio head unit and instrument cluster.

5. A control system as in claim 1, wherein said firewall is an active firewall.

6. A control system as in claim 1, wherein said firewall is comprising:
   a power management module;
   an I/O control;
   at least one storage module;
   a microcontrol unit in communication with said power management module, said I/O controller and said storage module;
   at least one bus interface in communication with said microcontrol unit;
   at least one network fail safe device in communication with said microcontrol unit and said at least one bus interface; and
   at least one physical bus interface in communication with said microcontrol unit and at least one said network fail safe device.

7. A control system as in claim 6, wherein said microcontrol unit is further comprised of flash memory.

8. A control system as in claim 1, wherein said at least one vehicle device are a security immobilizer circuit and an engine control unit and said security immobilizer circuit is connected to said engine control unit.

9. A control system as in claim 1, further comprising at least one network fail safe device, wherein said network fail safe device is between said at least two data communications bus.

10. A control system as in claim 9, further comprising at least one microcontroller, wherein said microcontroller monitors said at least two data communications bus and issues directives to control the at least one vehicle device according to the status of said at least two data communications bus.

11. A control system as in claim 1, wherein at least one said data communications bus is private.

12. A control system as in claim 1, wherein at least one said data communications bus is a vehicle bus.

13. A method of exchanging information with a control system for a vehicle comprising the steps of:
    providing at least one data communications bus;
    providing at least one firewall in communication with said at least one data communications bus, wherein said at least one firewall creates at least two data communications bus from said at least one data communications bus;

providing at least one vehicle device in communication with at least one of said at least two data communications bus, wherein said at least one vehicle device is in communication with said at least one firewall;

providing at least one firewalled controller in communication with said at least one firewall, wherein said firewalled controller allows a directive to said firewall through said at least one communication bus which controls said at least one vehicle device and said firewall allows said directive through a second at least one data communications bus which controls said at least one vehicle device; and providing a security authorizing device, wherein said security authorizing device authorizes use or denies use and when said security authorizing device authorizes use said firewall obtains security codes from said security authorizing device said firewall emulates said security codes and issues starting procedures according to said security codes.

14. A method of exchanging information with a control system as in claim 13, wherein said firewall issues and transmits said directive through said at least two data communications bus.

15. A method of exchanging information with a control system as in claim 13, further comprising the step of isolating said at least one vehicle device.

16. A method of exchanging information with a control system for a vehicle as in claim 13, wherein said security authorizing device is selected from the group consisting of an electronic ignition switch, transponder receiver, and convertible top module.

17. A method of exchanging information with a control system for a vehicle as in claim 13, further comprising the steps of:

providing a suspension control module, wherein said firewall issues directives to said suspension control module in response to a trigger.

18. A method of exchanging information with a control system for a vehicle as in claim 17, wherein said trigger is manual.

19. A method of exchanging information with a control system for a vehicle as in claim 17, wherein said trigger is responsive to a trigger input.

20. A method of exchanging information with a control system for a vehicle as in claim 13, wherein said firewalled controller is an electronic ignition switch and said electronic ignition switch may perform secondary functions in response to a trigger input.

21. A method of exchanging information with a control system for a vehicle as in claim 13, wherein said firewall changes said directive prior to transmission.

22. A method of exchanging information with a control system for a vehicle as in claim 13, further comprising a central gateway, wherein said central gateway is between the at least one data communication bus and a third data communication bus.

23. A method of exchanging information with a control system for a vehicle as in claim 13, wherein said at least one vehicle device is selected from the group consisting of engine control unit, transmission control unit, antilock brake system, brake assist system, instrument cluster, climate control, rear signal acquisition module, front signal acquisition module, radio head unit and instrument cluster.

24. A method of exchanging information with a control system for a vehicle as in claim 13, wherein said firewall is an active firewall.

25. A method of exchanging information with a control system for a vehicle as in claim 13, said firewall comprising:

a power management module;

an I/O control;

at least one storage module;

a microcontrol unit in communication with said power management module, said I/O controller and said storage module;

at least one bus interface in communication with said microcontrol unit;

at least one network fail safe device in communication with said microcontrol unit and said at least one bus interface; and at least one physical bus interface in communication with said microcontrol unit and at least one said network fail safe device.

26. A method of controlling a control system for a vehicle as in claim 13, wherein said micro controller unit is further comprised of flash memory.

27. A method of controlling a control system for a vehicle as in claim 13, wherein said at least one vehicle device are a security immobilizer circuit and an engine control unit and said security immobilizer circuit is connected to said engine control unit.

28. A method of controlling a control system for a vehicle as in claim 13, further comprising: providing at least one network fail safe device, wherein said network fail safe device is between said at least two data communications bus for bridging between said at least two data communication bus.

29. A method of controlling a control system for a vehicle as in claim 13, further comprising: providing at least one microcontroller, wherein said microcontroller monitors said at least two data communications bus and issues directives according to the status of said at least two data communications bus.

30. A method of controlling a control system for a vehicle as in claim 13, wherein at least one said data communications bus is private.

31. A method of exchanging information with a control system for a vehicle as in claim 13, wherein at least one said data communications bus is a vehicle bus.

* * * * *